STUART & BRIDGE.
Base Burning Fire Place Stove.
No. 3,608.
Reissued Aug. 17, 1869.
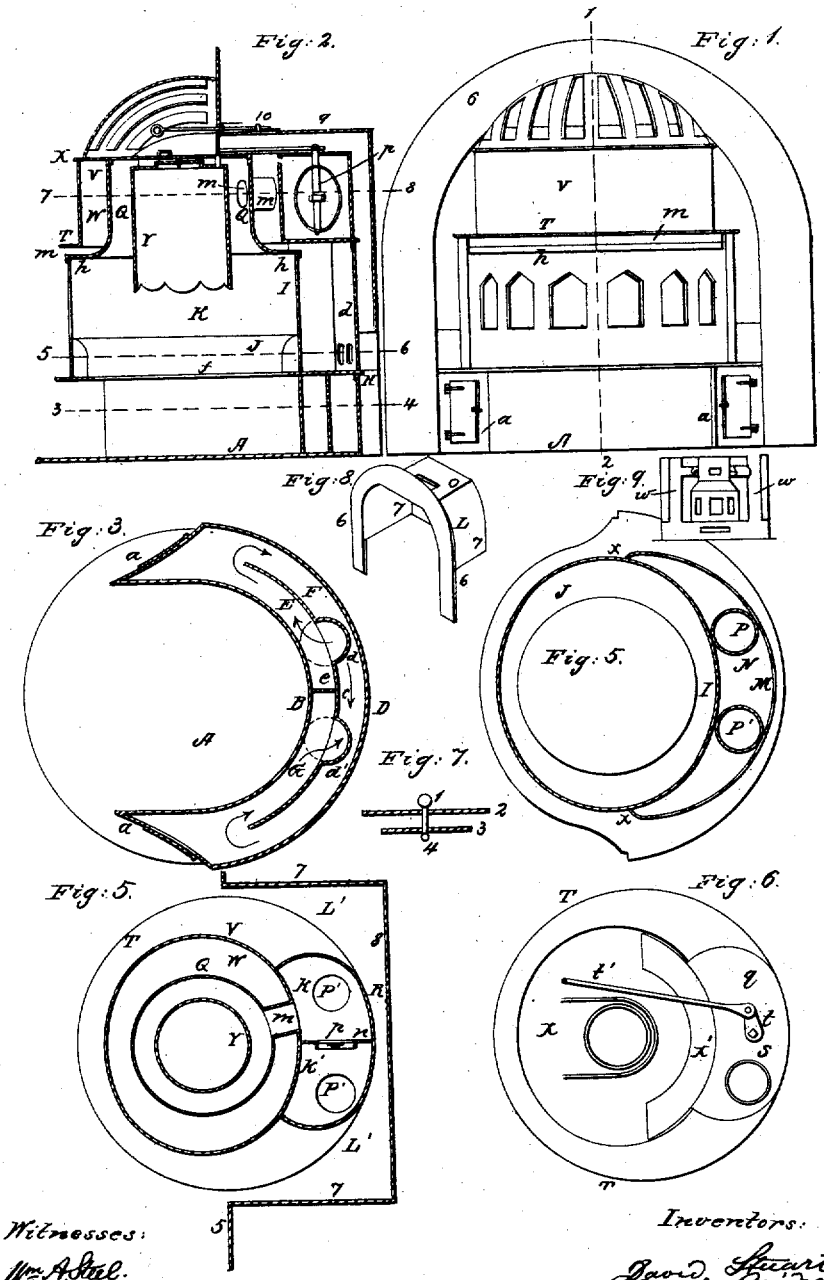
Witnesses:
Wm. A. Steel.
John Parker.
Inventors:
David Stuart 2d.
Lewis Bridge.
By their Atty.
R. Howson
N. PETERS, Photo-Lithographer, Washington, D. C.

United States Patent Office.

DAVID STUART AND RICHARD PETERSON, OF PHILADELPHIA, PENNSYLVANIA, ASSIGNEES OF DAVID STUART AND LEWIS BRIDGE.

*Letters Patent No.* 79,275, *dated June* 23, 1868; *reissue No.* 3,608, *dated August* 17, 1869.

DIVISION A.

BASE-BURNING FIRE-PLACE STOVE.

The Schedule referred to in these Letters Patent and making part of the same.

*To all whom it may concern:*

Be it known that Letters Patent for DAVID STUART and LEWIS BRIDGE'S Improvements in Base-Burning Fire-Place Stoves were, on June 23, 1868, granted to STUART, PETERSON, AND COMPANY, of Philadelphia, Pennsylvania, of which firm we, the undersigned, DAVID STUART and RICHARD PETERSON, are the sole members; and we do hereby declare the following to be a full, clear, and exact description of that part of the said invention, which relates more especially to the arrangement, described hereafter, of the interior of the stove.

In order to enable others skilled in the art to make and apply the invention, we will now proceed to describe its construction and operation, reference being had to the accompanying drawing, which forms a part of this specification, and in which—

Figure 1 is a front view of the improved fire-place stove;

Figure 2, a vertical section on the line 1–2, fig. 1;

Figure 3, a sectional plan on the line 3–4, fig. 2;

Figure 4, a sectional plan on the line 5–6, fig. 2;

Figure 5, a sectional plan on the line 7–8, fig. 2;

Figure 6, a top view of the stove;

Figure 7, a view of the covers of the feeder;

Figure 8, a perspective view of the casing to fit in the fire-place and receive the stove; and Figure 9, a diagram, showing a front view of a fire-place stove of the ordinary construction.

The base of the stove will be best observed by reference to figs. 1 and 3, in which A represents the lower plate, the latter being of an oval form, and to this plate are fitted the curved plates B, C, and D, the plates B and D being connected together at their ends by plates *a a*, in each of which is an opening provided with a sliding door.

The plate C is shorter than the other curved plates, and has two semicircular projections *d* and *d'*, between which is a partition, *e*, extending across the space between the plates B and C.

It may be stated in the outset that the products of combustion pass downward into the semicircular projection *d*, into the flue E, between the plates B and C, thence, in the direction of the arrows, into and through the flue F, between the plates C and D, and thence into the flue G to the semicircular projection *d'*, as shown in fig. 3.

The upper edges of the plates B C D and *a a* are fitted to the plate H, on which rests the casing I, enclosing the fire-chamber K, the fire-pot J, and grate *f*.

At the rear of the casing I is a curved plate, M, secured to the casing I at *x x*, so as to form the crescent-shaped air-chamber N, in which are two pipes, P and P', the former communicating with the interior of the semicircular projection *d*, and the latter with the semicircular projection *d'*, above referred to. This plate M is so perforated as to admit a plentiful supply of cold air to the chamber N.

To the upper edge of the casing I is fitted the horizontal flange *h*, of the casing Q, which is contained within an exterior casing, V, the latter being fitted to a plate, T, which rests on the curved plate M, but is so far above the flange *h* of the casing Q, as to leave a space, *m'*, for the admission of air to the space W, between the casings Q and V.

At the rear of the casing V is a curved plate, R, which, with the said casing, encloses a space separated by a partition, *n*, into two compartments *k* and *k'*, with the former of which the fire-chamber communicates through a tube, *m*.

The partition *n*, between the two compartments, has an opening provided with a throttle-valve, *p*, the spindle of which passes through a cover-plate, *q*, and is provided with an arm, *t*, to be operated by a rod, *t'*, fig. 6.

In this cover-plate is an opening, *s*, to which is fitted the pipe for conveying the products of combustion from the compartment *k'* to the chimney.

It should be stated here that the pipe P communicates with the compartment *k*, and the pipe P' with the compartment *k'*. (See fig. 5.)

A plate, X, is fitted to the upper edges of the casings V and Q, this plate being of the form represented in fig. 6, so as to leave an opening, X', through which the air heated in the chamber W, between the casings Q and V, can escape.

From the plate X is suspended the fuel-reservoir or feeder Y, which terminates below in the fire-chamber, this feeder having, at the top, an opening for the admission of fuel, which is passed through an opening in the plate X above.

The cover consists of two disks, 2 and 3, the former being larger in diameter than the latter, and resting on the plate X, while the disk 3 rests on the feeder below the said plate.

The two disks are loosely connected together by a central pin, 4, so that each disk will be certain to rest on its proper bearing.

The products of combustion can pass between these two covers, that is, between the top of the feeder and under side of the plate X, thus imparting heat which would be lost if the feeder extended to the plate X, and a single cover only were used.

In fig. 5, the line 5 represents the face of a wall, against which bears the arched plate 6, figs. 1 and 8, and to the rear of this plate is secured a casing, L, composed of the side plates 7 7 and rear plate 8, the side plates meeting the top plate 9, which is made flat, as shown in the perspective view, fig. 8.

This casing is fitted into the chimney-place L′, made in the wall 5, and is the recess into which the stove projects. Through the top 9 of this casing projects the pipe P′ for conveying the products of combustion to the flue of the chimney, and in the top 9, immediately above the opening X′, fig. 6, is an opening provided with a suitable damper, which may be so adjusted that the heated air can pass upward into the passage which conveys the heated air to rooms above that in which the stove is situated, or the damper may be so closed that the heated air will be projected outward into the room containing the stove.

When the valve *p* is closed, the products of combustion will pass from the fire-chamber through the opening *m*, fig. 5, into the compartment *k*, thence down the pipe P into the passage F, fig. 3, along the passage F into the passage G, thence through the pipe P′ to the compartment *k*′, and thence to the chimney. On opening the valve *p*, however, the products of combustion will pass directly from the chamber *k*, through the opening in the partition *n*, into the chamber *k*′, and thence to the chimney.

The air admitted through the casing M, at the rear of the stove, into the chamber N, is heated by intimate contact with the outer surfaces of these pipes P and P′, and by contact with the back of the casing I, before it passes off through the opening X′.

Another and independent volume of air is heated in the chamber W, having been admitted thereto through the opening *m*′ in the front of the stove, the air thus heated meeting the other volume of air, and passing with the same through the said opening X′

On the top of that portion of the stove which projects into the room is a plate, H′, made in the form of a section of a hollow sphere, the plate which rests on the top plate X of the stove, and against the wall 5, having openings for the passage of heated air into the room.

The main advantages of the improved stove will be rendered apparent by comparing it with the ordinary well-known fire-place stove, of which a view, on a small scale, is shown in fig. 9.

In stoves of this class, there are two pipes, *w w*, one on each side of the main body of the stove, the products of combustion from which pass down one pipe and up the other to the chimney.

Owing to these external pipes, the stove occupies an extended space, and is frequently too large for an ordinary chimney-place; but by constructing a stove in the manner described, and by arranging the pipes for the passage of the products of combustion to the chimney within the stove itself, the latter may be made of a convenient size, and this without any loss of heat. Moreover, the improved stove can be arranged to project further into the room than ordinary fire-place stoves, and consequently the room is more thoroughly heated than when the stove is moved far back into the fire-place.

Another advantage of the improved stove is the situation of the pipe *p*′ for the escape of the products of combustion, this pipe being conveniently arranged for direct communication without elbow-pipes to the flue of the chimney.

In ordinary fire-place stoves, it is usual to supply the feeder with fuel from the front, an arrangement which demands a short feeder. By introducing the fuel through the top of the stove, a longer feeder may be used, and this long feeder enables us to form an air-chamber, W, which greatly increases the heating-properties of the stove.

We claim as the invention of the said STUART and BRIDGE, and desire to secure by Letters Patent—

1. The base of the stove enclosing the passages E, F, and G, arranged and communicating with the pipes P and P′, substantially as described.

2. Two or more pipes P and P′, arranged within the outer casing of a fire-place stove, for conveying the products of combustion to the chimney, and for heating the air admitted to the space within the said outer casing, all substantially as and for the purpose herein set forth.

3. The pipes P and P′, in combination with the compartments *k* and *k*′, and the valved partition between the same.

4. The double cover, consisting of plates 2 and 3, one for fitting to the top of the stove, and the other to the top of the feeder, and so arranged that the products of combustion can pass between them.

In testimony whereof, we have signed our names to this specification, before two subscribing witnesses.

DAVID STUART.
RICHARD PETERSON.

Witnesses:
A. H. PERKINPINE,
JOHN P. CONNELLY.